(12) United States Patent
Theobald

(10) Patent No.: US 9,701,012 B1
(45) Date of Patent: Jul. 11, 2017

(54) CONTROLLED INTERACTION BETWEEN A MOBILE ROBOT AND ANOTHER ENTITY

(71) Applicant: Daniel Theobald, Somerville, MA (US)

(72) Inventor: Daniel Theobald, Somerville, MA (US)

(*) Notice: Subject to any disclaimer, the term of this patent is extended or adjusted under 35 U.S.C. 154(b) by 0 days.

(21) Appl. No.: 14/528,493

(22) Filed: Oct. 30, 2014

(51) Int. Cl.
*B25J 9/16* (2006.01)

(52) U.S. Cl.
CPC .......... *B25J 9/16* (2013.01); *Y10S 901/01* (2013.01); *Y10S 901/27* (2013.01)

(58) Field of Classification Search
CPC ......... B25J 9/16; Y10S 901/01; Y10S 901/27; G05B 2219/40113
USPC ..... 700/245, 250; 901/1, 27, 50; 318/568.12
See application file for complete search history.

(56) References Cited

U.S. PATENT DOCUMENTS

| | | | | |
|---|---|---|---|---|
| 4,638,445 A * | 1/1987 | Mattaboni | ............... | B25J 9/0003 180/168 |
| 5,737,217 A * | 4/1998 | Nishikawa | ........... | B62D 57/032 180/8.6 |
| 6,459,955 B1 * | 10/2002 | Bartsch | ...................... | A47L 9/00 318/568.11 |
| 7,765,028 B2 * | 7/2010 | Orita | ..................... | G05D 1/0088 700/101 |
| 8,214,079 B2 * | 7/2012 | Lee | ......................... | B25J 9/1602 700/245 |
| 2003/0208302 A1 * | 11/2003 | Lemelson | .............. | G05B 19/19 700/245 |
| 2007/0129849 A1 * | 6/2007 | Zini | .................. | G05B 19/41895 700/258 |
| 2007/0150105 A1 * | 6/2007 | Orita | ..................... | B62D 57/032 700/245 |
| 2007/0192910 A1 * | 8/2007 | Vu | ........................... | B25J 5/007 700/245 |
| 2008/0086236 A1 * | 4/2008 | Saito | ..................... | G01S 5/0252 700/245 |
| 2011/0166701 A1 * | 7/2011 | Thacher | ............... | A01D 34/008 700/245 |
| 2012/0185095 A1 * | 7/2012 | Rosenstein | .............. | B25J 5/007 700/259 |
| 2013/0184866 A1 * | 7/2013 | Ota | .......................... | B25J 9/162 700/250 |
| 2014/0350725 A1 * | 11/2014 | LaFary | .................. | G06N 3/008 700/253 |
| 2015/0120046 A1 * | 4/2015 | Kim | .......................... | H04B 1/38 700/250 |
| 2015/0151440 A1 * | 6/2015 | Bonin | .................. | B25J 19/0004 700/253 |

* cited by examiner

*Primary Examiner* — Bao Long Nguyen
(74) *Attorney, Agent, or Firm* — Albert J. Brunett

(57) ABSTRACT

Devices, systems and methods are provided related to controlled interaction between a mobile robot and another entity in an operating environment. In one method, for example, performance of a task for a time is signaled for, wherein the performance of the task involves the entity. The mobile robot is operated to interact with the entity at the time.

2 Claims, 10 Drawing Sheets

CONTROLLED INTERACTION BETWEEN A MOBILE ROBOT AND ANOTHER ENTITY

BACKGROUND OF THE INVENTION

1. Technical Field

This disclosure relates generally to a mobile robot and, more particularly, to interaction between a mobile robot and another entity.

2. Background Information

A mobile robot may encounter various other entities while performing a task within its operating environment. These encounters, if not planned for or organized, may significantly increase time required to perform the task and, thus, energy consumed by the mobile robot in performing the task.

SUMMARY OF THE DISCLOSURE

Devices, systems and methods are provided related to controlled interaction between at least one mobile robot and at least one other entity in an operating environment. In one method, for example, performance of a task for a time is signaled for, wherein the performance of the task involves the entity. The mobile robot is operated to interact with the entity at the time.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

FIG. 6 is a block diagram illustration of another mobile robot system.

DETAILED DESCRIPTION

Figure 1:
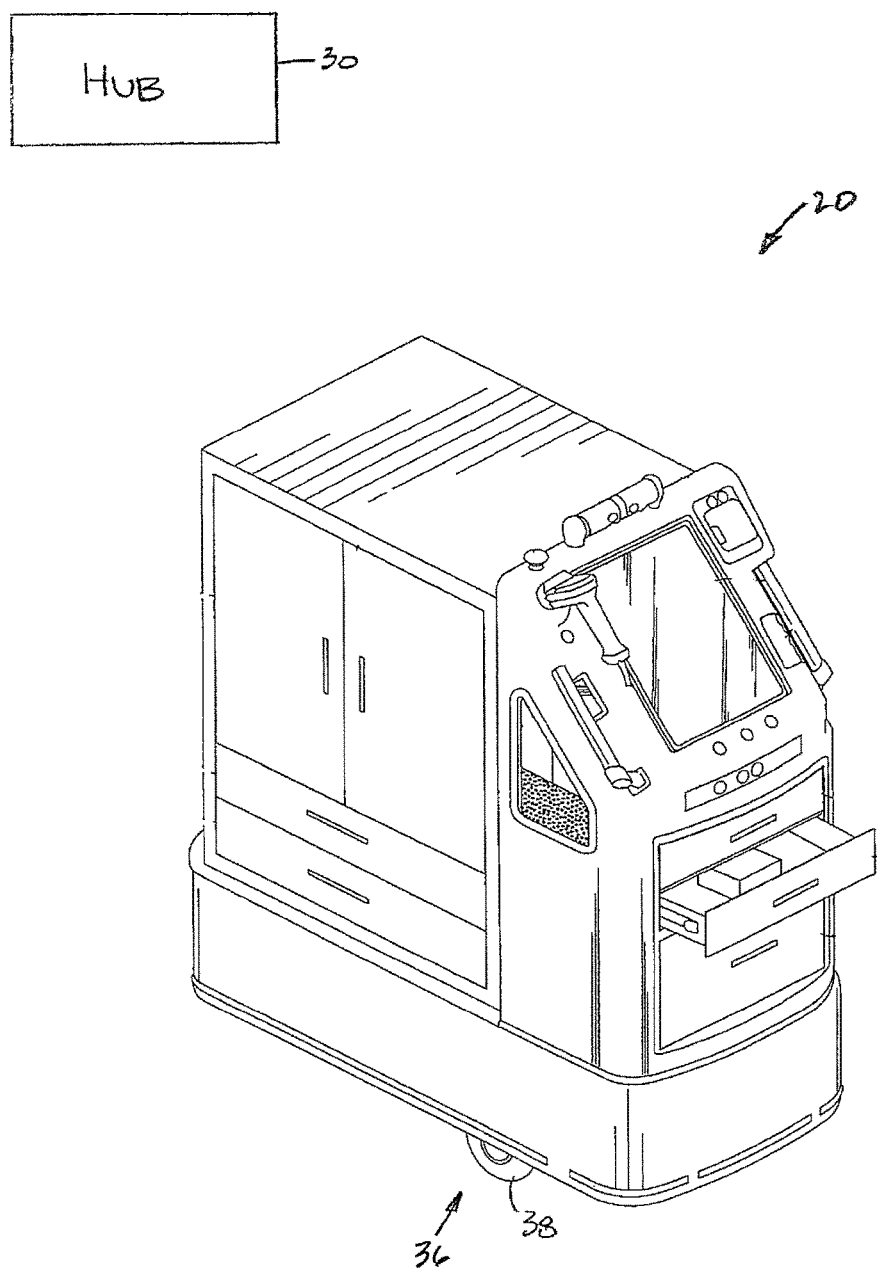
FIG. 1 is a perspective diagrammatic illustration of a mobile robot.

FIG. 1 illustrates a mobile robot 20 configured to perform one or more tasks within an operating environment. This mobile robot 20 is also configured to interact with one or more other entities within its operating environment before, during and/or after the performance of its task(s). This interaction may be tangible or intangible as well as active or passive. The mobile robot 20, for example, may physically pick up, drop off, move, reconfigure and/or transport an entity such as an item for shipment and/or delivery. In another example, the mobile robot 20 may wirelessly signal an entity such as an actuatable device or another mobile robot 20 to perform a task. In another example, the mobile robot 20 may physically pass through an opening in an entity such as a passageway; e.g., a doorway, a gateway, etc. In still another example, the mobile robot 20 may enter and ride an entity such as an elevator car or any other type of lift and/or transport. The mobile robot 20 of the present disclosure, however, is not limited to the foregoing exemplary interactions.

The mobile robot 20 may be configured as an autonomous mobile robot that performs one or more of its tasks without continuous outside control and/or intervention. The mobile robot 20, for example, may receive instructions to perform a certain task at a certain location. The mobile robot 20 may subsequently determine and perform the operation(s) necessary to complete the task based on, for example, its current location, surrounding obstacles, its operating environment, the type of task to be performed, etc. The mobile robot 20 may also adapt to unknown, new and/or changing operating environments without additional (e.g., human) outside control and/or intervention.

The mobile robot 20 may be fully autonomous during performance of one or more of its tasks. The mobile robot 20 may also or alternatively be semi-autonomous during performance of one or more of its tasks. The mobile robot 20 may also or alternatively be (e.g., remote) controlled by an operator (e.g., a human controller) during performance of one or more of its tasks.

The term "fully autonomous" may be used to describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may be used to describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, etc.

Figure 2:
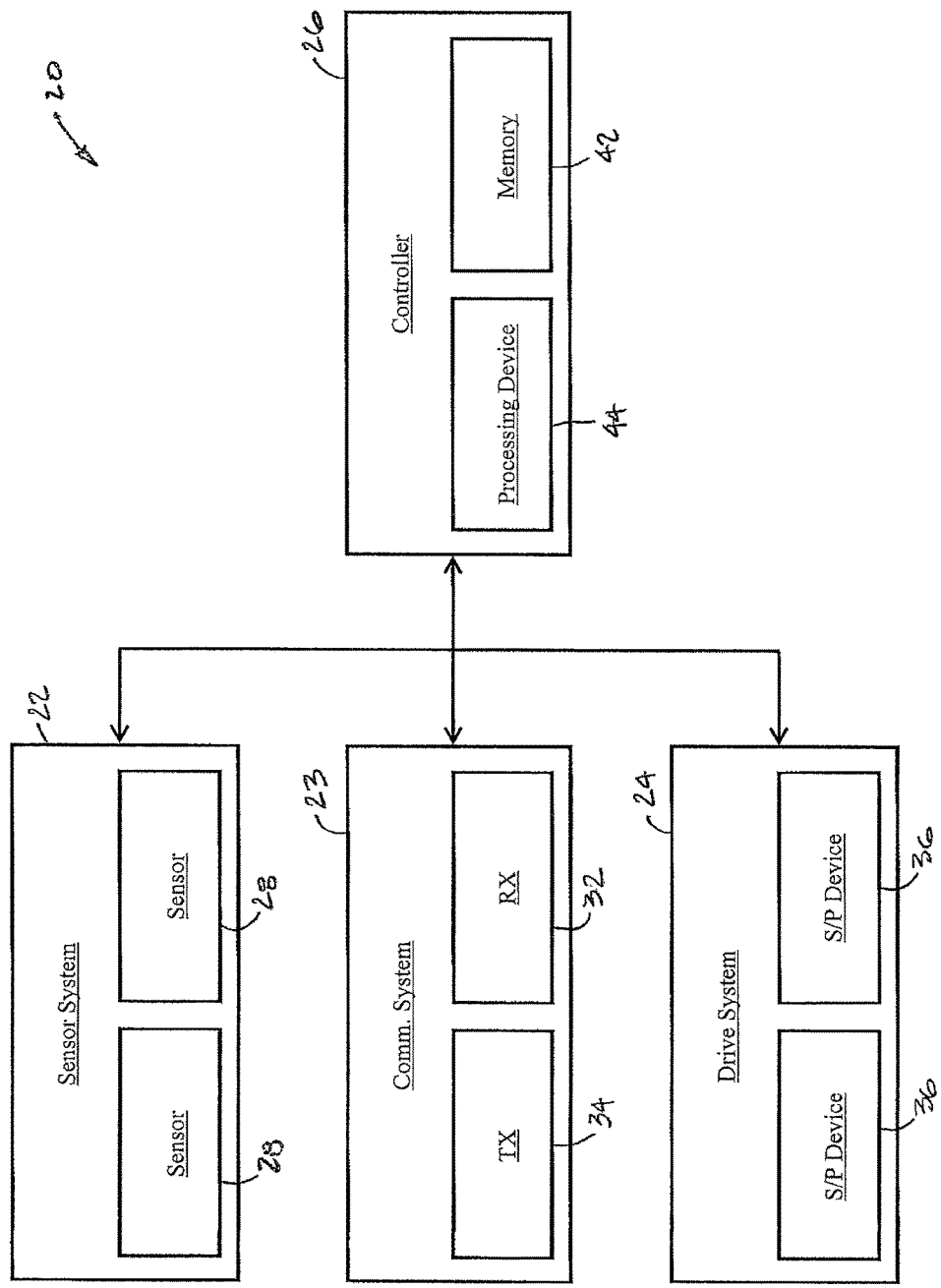
FIG. 2 is a block diagram illustration of a mobile robot system.

FIG. 2 is a block diagram of the mobile robot 20. The mobile robot 20 includes a sensor system 22, a communication system 23 and a drive system 24. The mobile robot 20 also includes a controller 26 in signal communication (e.g., hardwired or wirelessly connected) with one or more of the other components (e.g., 22-24) of the mobile robot 20.

The sensor system 22 is adapted to survey one or more aspects of the mobile robot's operating environment. The sensor system 22 is also adapted to receive location data indicative of a location of the mobile robot 20 and/or location(s) of other entities within the operating environment.

The sensor system 22 includes one or more sensors 28; e.g., locator sensors. These sensors 28 may be operated to spatially locate (e.g., triangulate) the mobile robot 20 relative to, for example, its surrounding environment, its geographic location and/or one or more locators; e.g., RF tags, physical landmarks, etc. Examples of a sensor which may be included with the sensor system 22 include, but are not limited to, a proximity sensor, a global positioning system (GPS), a radar system, an infrared system, a laser system, a radio transceiver, and a visual location system with at least one optical camera.

The communication system 23 is adapted to receive data from a remote computer 30 (see FIG. 1) such as, but not limited to, a central hub. The communication system 23 is also or alternatively adapted to send data to the remote computer 30. The communication system 23 may include a receiver 32 and a transmitter 34. The receiver 32 may be a cellular, satellite and/or radio receiver. The transmitter 34 may be a cellular, satellite and/or radio transmitter.

Figure 3:
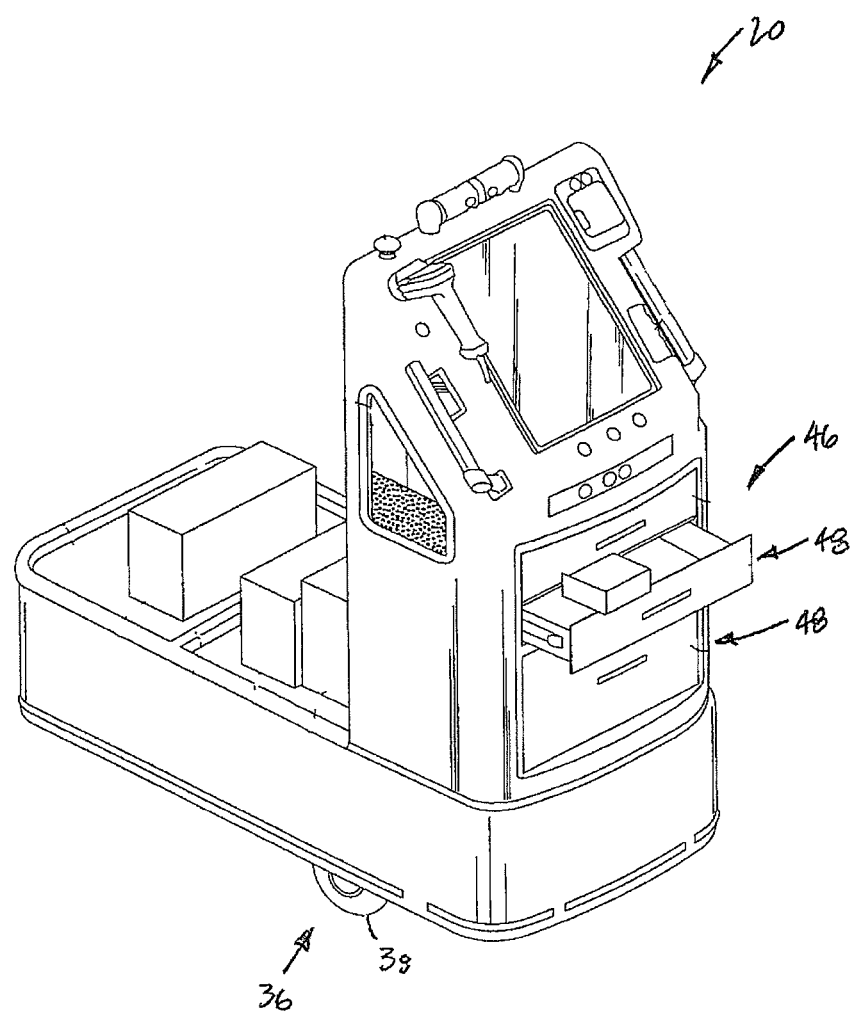
FIG. 3 is a perspective diagrammatic illustration of another mobile robot.
Figure 4:
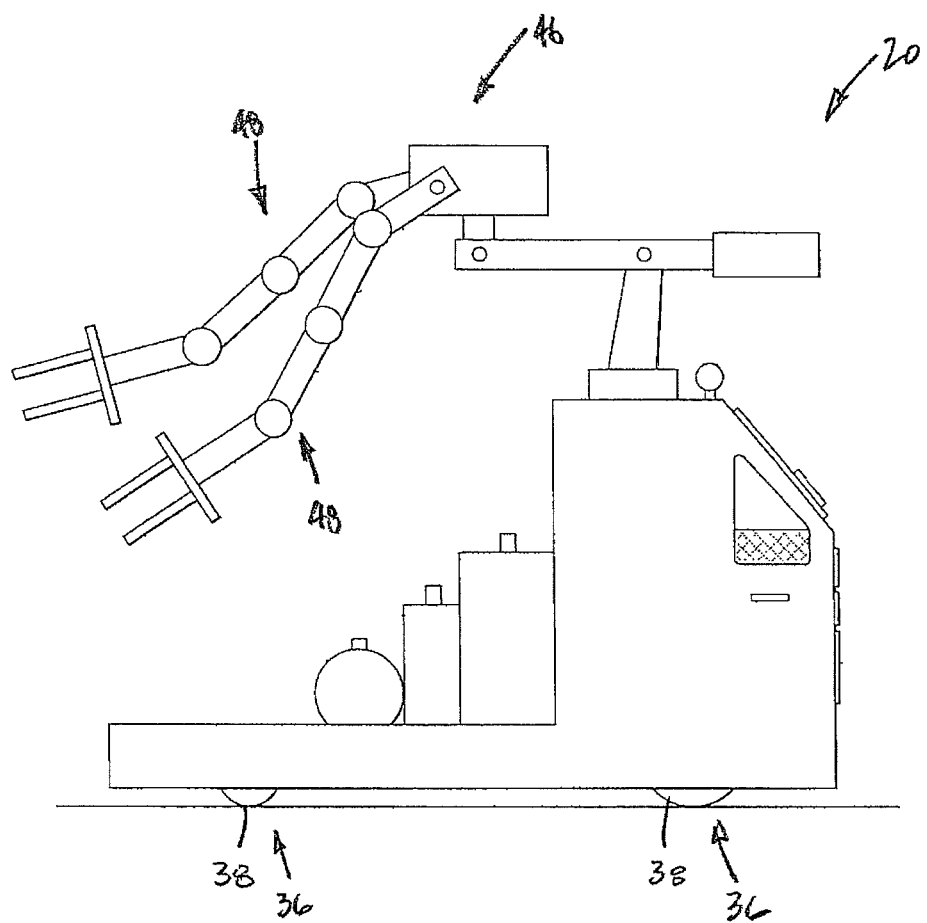
FIG. 4 is a side view diagrammatic illustration of another mobile robot.
Figure 5:
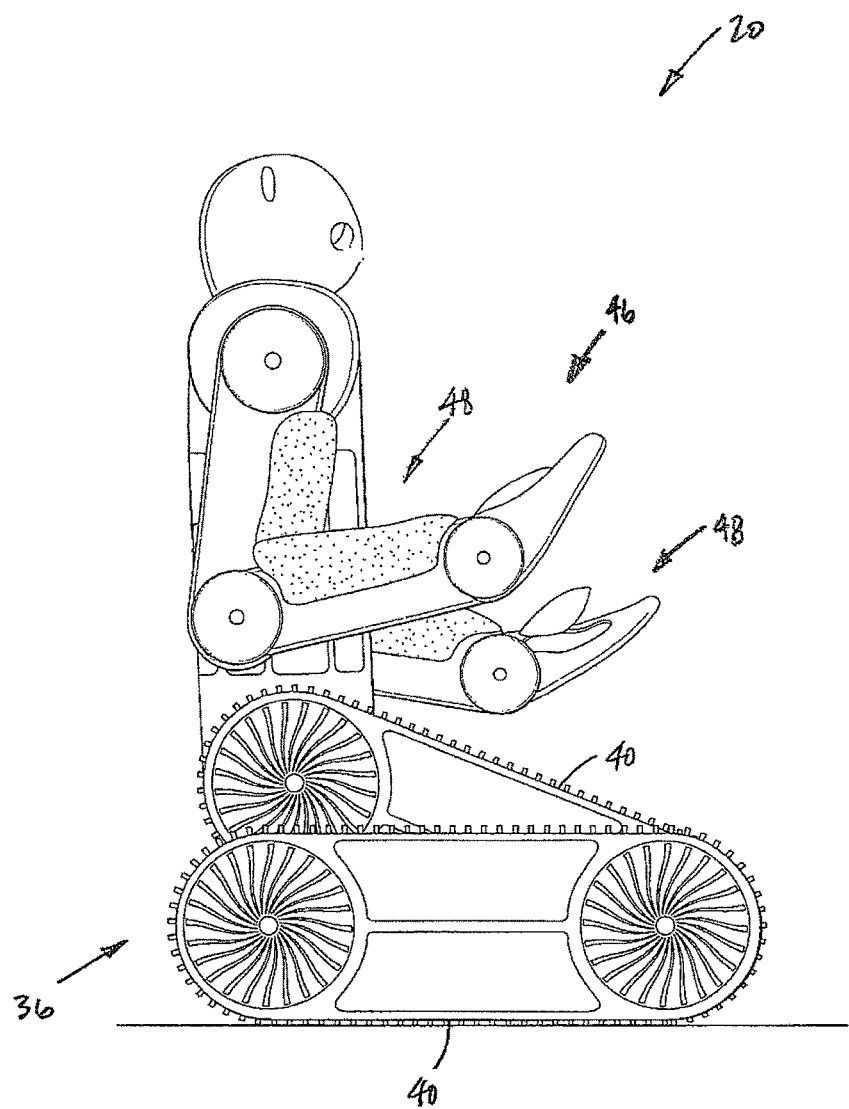
FIG. 5 is a side view diagrammatic illustration of another mobile robot.
Figure 9:
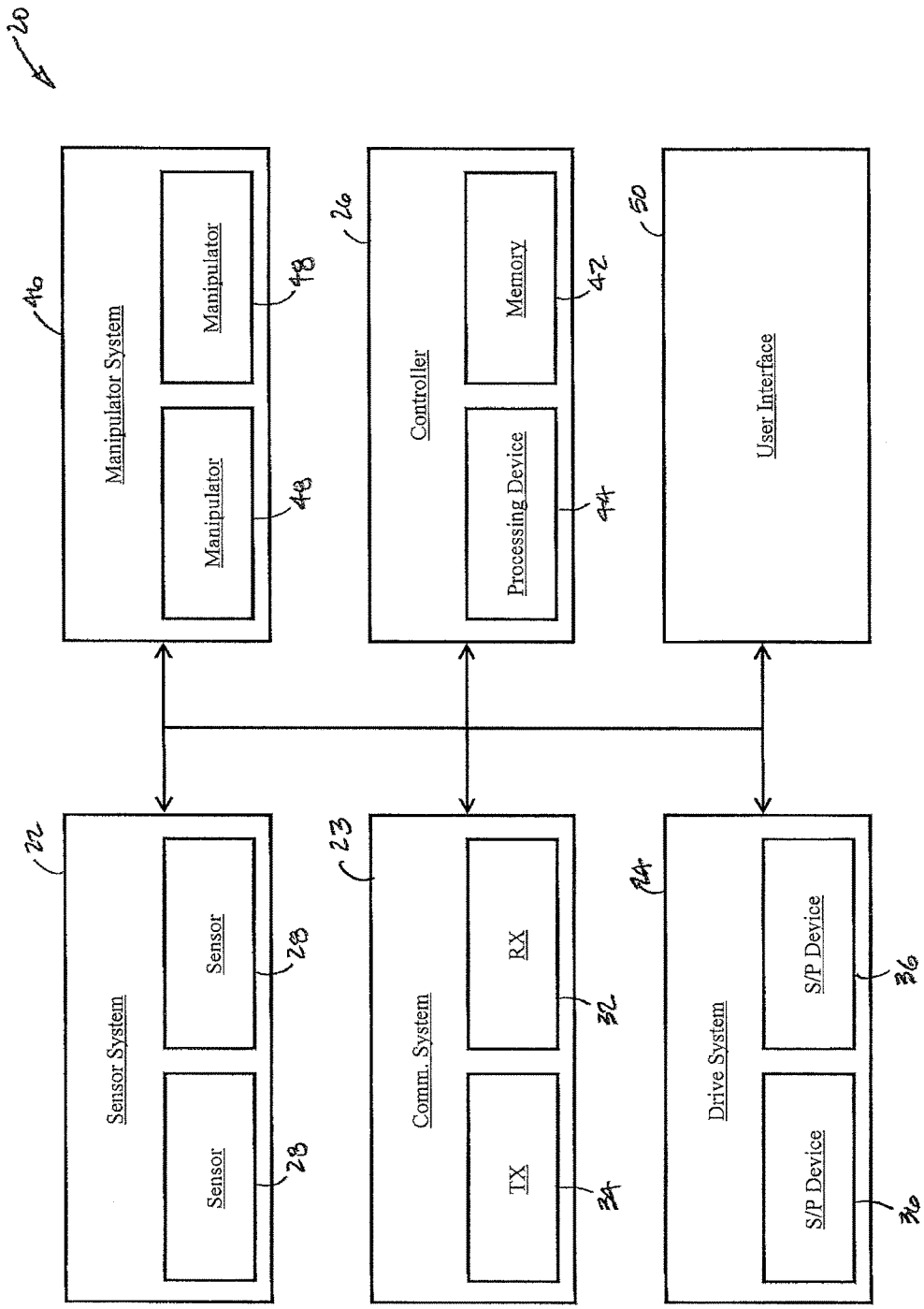
FIG. 9 is a flow diagrams of one activity of the mobile robot.

The drive system 24 is adapted to move the mobile robot 20 within its operating environment; e.g., inside and/or outside of a hospital. The drive system 24 includes one or more steering and/or propulsion devices 36. The drive system 24 of FIGS. 1, 3 and 4, for example, includes a plurality of wheels 38. One or more of these wheels 38 is driven by at least one motor. One or more of the wheels 38 is pivoted so as to steer mobile robot 20 movement. The rotational velocity of some or all of the wheels 38 may also or alternatively be individually controlled so as to provide propulsion and steering. The drive system 24 of FIG. 5 includes a plurality of motorized (e.g., robotic and multi-linkage) track systems 40. The drive system 24, of course, may also or alternatively include one or more propulsion devices with configurations other than those described above and illustrated in the drawings.

The controller 26 may be implemented with hardware or a combination of hardware and software. The hardware may include memory 42 and at least one processing device 44, which may include one or more single-core and/or multi-core processors. The hardware, of course, may also or alternatively include analog and/or digital circuitry other than that described above.

The memory 42 is configured to store software (e.g., program instructions) for execution by the processing device 44, which software execution may control and/or facilitate performance of one or more operations such as those described in the methods below. The memory 42 may be a non-transitory computer readable medium. For example, the memory 42 may be configured as or include a volatile memory and/or a nonvolatile memory. Non-limiting examples of a volatile memory may include a random access memory (RAM) such as a dynamic random access memory (DRAM), a static random access memory (SRAM), a synchronous dynamic random access memory (SDRAM), a video random access memory (VRAM), etc. Non-limiting examples of a nonvolatile memory may include a read only memory (ROM), an electrically erasable programmable read-only memory (EEPROM), a computer hard drive, etc.

It is worth noting, the mobile robot 20 of the present disclosure is not limited to the exemplary configuration and components described above. For example referring to FIG. 6, is some embodiments, the mobile robot 20 may also include a manipulator system 46 in signal communication with the controller 26.

The manipulator system 46 includes one or more manipulators 48. These manipulators 48 are adapted to move or assist with the movement of one or more items. One or more of the manipulators 48, for example, may each be configured as a robotic manipulator arm (see FIGS. 4 and 5). Each manipulator arm may be electronically, hydraulically, pneumatically and/or mechanically actuated. Each manipulator arm may include an end effector, which is connected to one or more arm members (e.g., linkages). Examples of an end effector include, but are not limited to, a gripping device, a suction device, an electromagnet, a winch, a clasp, etc. In another example, one or more of the manipulators 48 may each be configured as a robotic drawer (see FIG. 3) or a robotic cabinet. Each drawer or cabinet door, for example, may be configured with at least one actuator, which is adapted to open and/or close the drawer or cabinet door. Examples of an actuator include, but are not limited to, an electric motor, a hydraulic or pneumatic pump, and a hydraulic cylinder.

The manipulator system 46 may also or alternatively include one or more types of manipulators 48 other than those described above and illustrated in the drawings. For example, one or more of the manipulators 48 may each be configured as a pallet jack, a lift platform, a conveyor system, a slide carriage or a crane. Other examples of manipulators are disclosed in U.S. Pat. No. 7,902,784, U.S. Pat. No. 7,719,222 and U.S. Pat. No. 7,348,747, each of which is hereby incorporated herein by reference in its entirety.

Referring again to FIG. 6, the mobile robot 20 may also or alternatively include a user interface 50 in signal communication with the controller 26. This user interface 50 may be adapted to receive information from an individual. The user interface 50 may also be adapted to present information to the individual. The user interface 50, for example, may visually and/or tactilely display a message to the individual. The user interface 50 may also or alternatively audibly reproduce a message for the individual.

The user interface 50 may include a display such as, for example, a visual display screen (e.g., a liquid crystal display (LCD) screen), a tactile display device (e.g., a Braille display), or a printer (e.g., a laser printer, an inkjet printer, a thermal printer, etc.). The user interface 50 may include an electro-acoustic transducer such as, for example, an audio speaker and/or a microphone connected to a voice control system. The user interface 50 may include a security device such as, for example, a bio-information sensor, a voice recognition system, a barcode scanner, a microchip (e.g., security chip) reader, a card reader, etc. Examples of a bio-information sensor include, but are not limited to, an eye retinal sensor, a fingerprint sensor and a handprint sensor. The user interface 50 may also or alternatively include a camera, a touch screen, a keypad, a keyboard, and/or any other type of user interface device.

Figure 7:
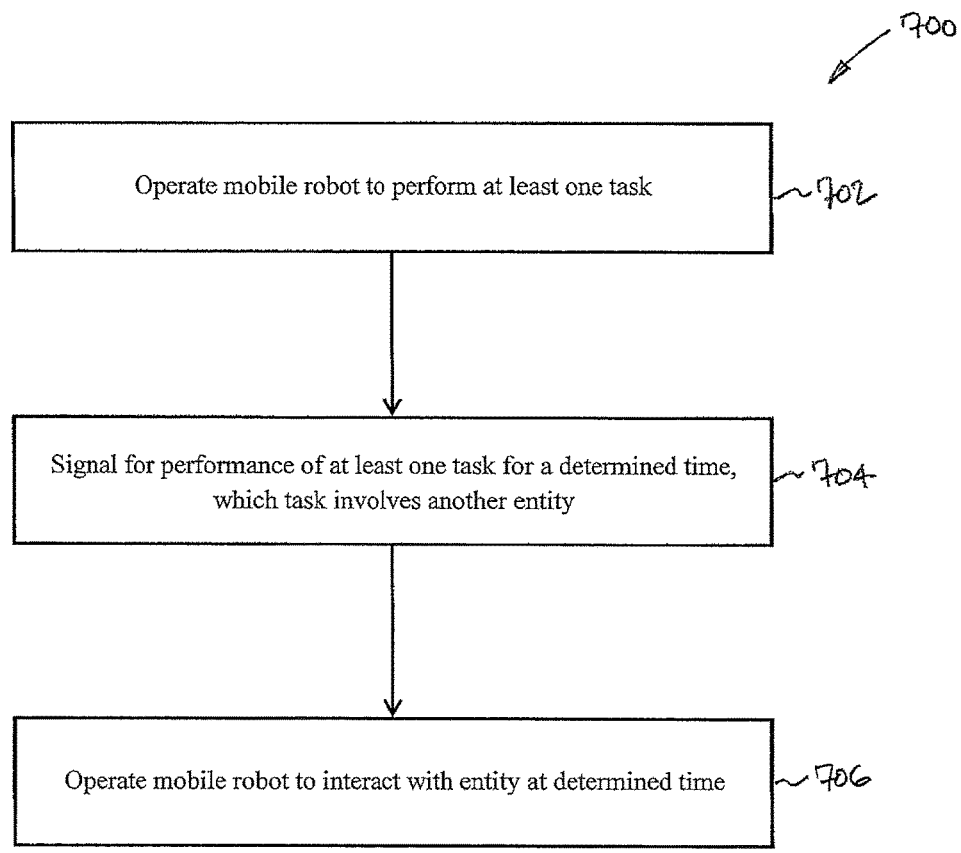
FIG. 7 is a flow diagram of a method involving a mobile robot and another entity in an operating environment.
Figure 8:
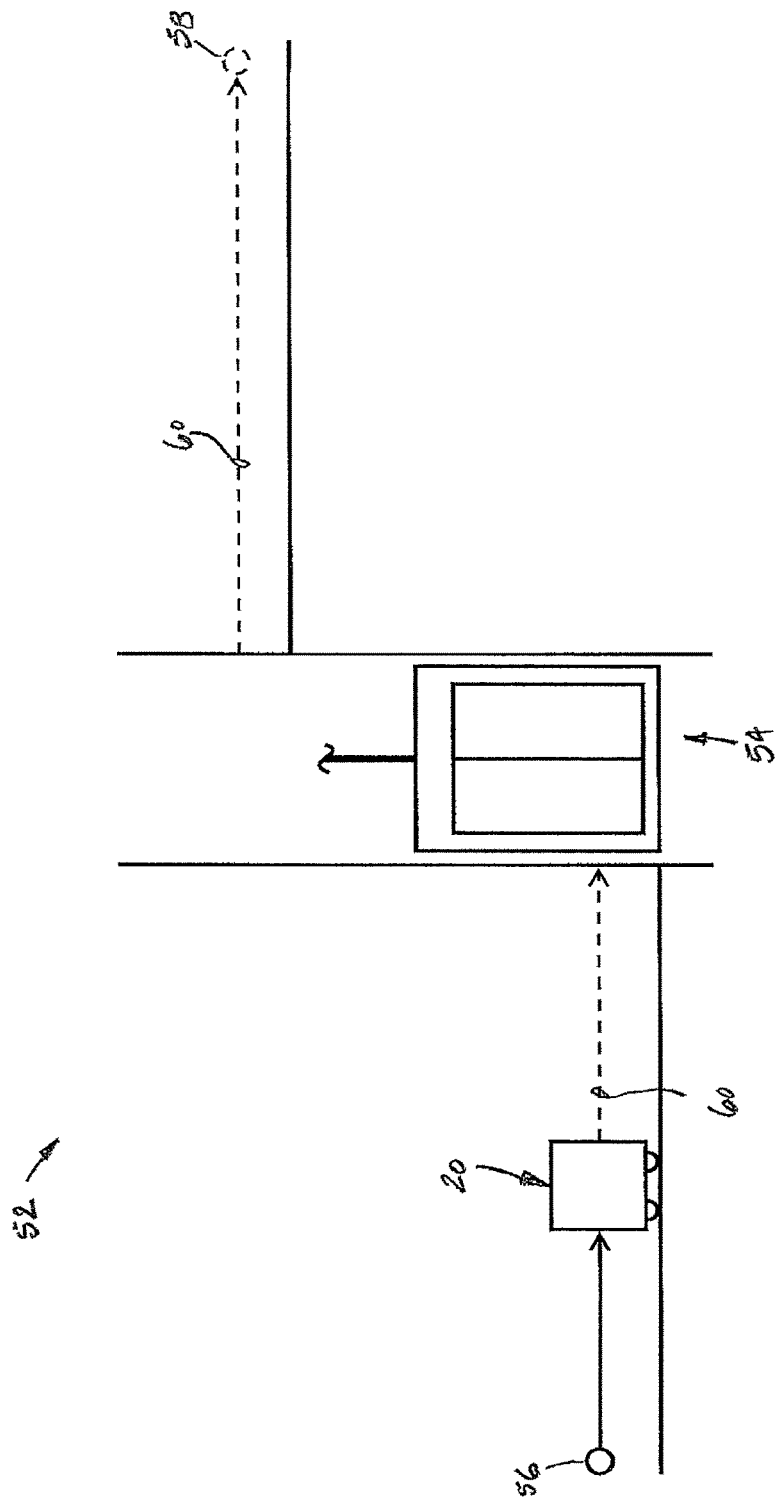
FIG. 8 is a schematic illustration of the mobile robot and the entity within the operating environment.
Figure 9:
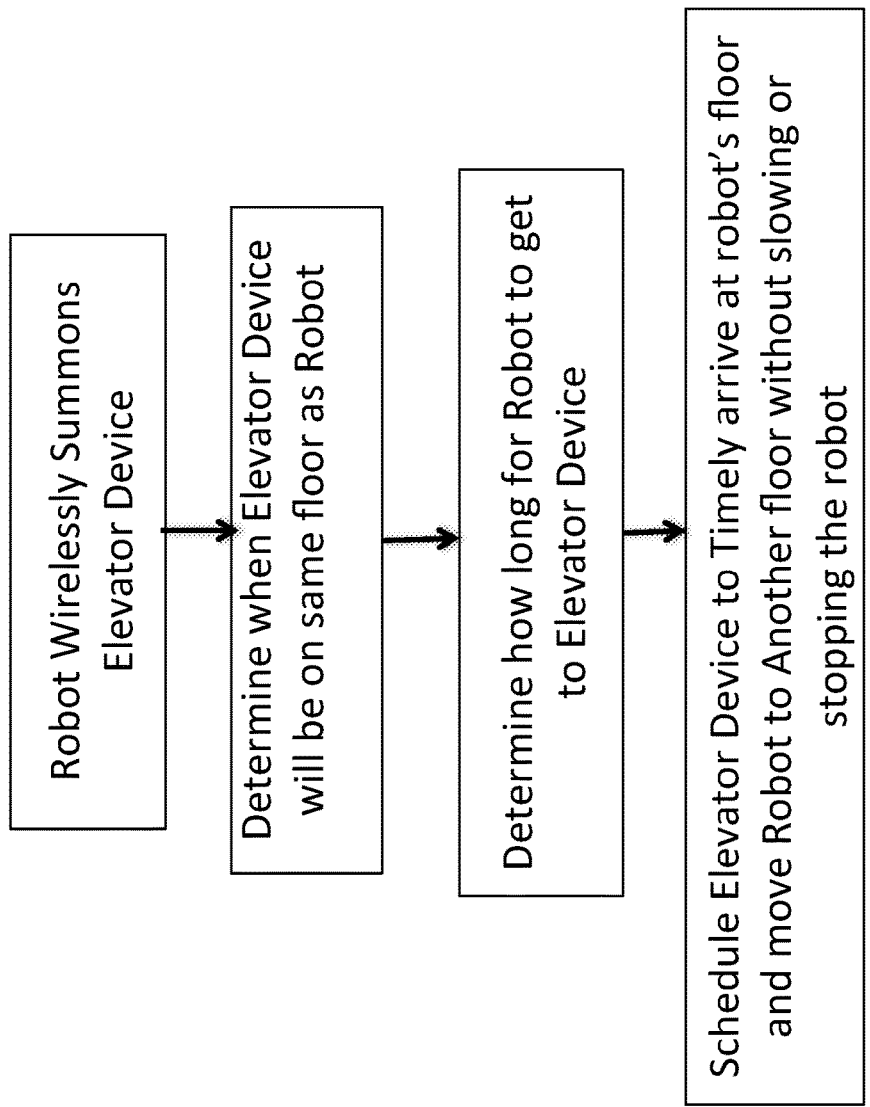
Figure 10:
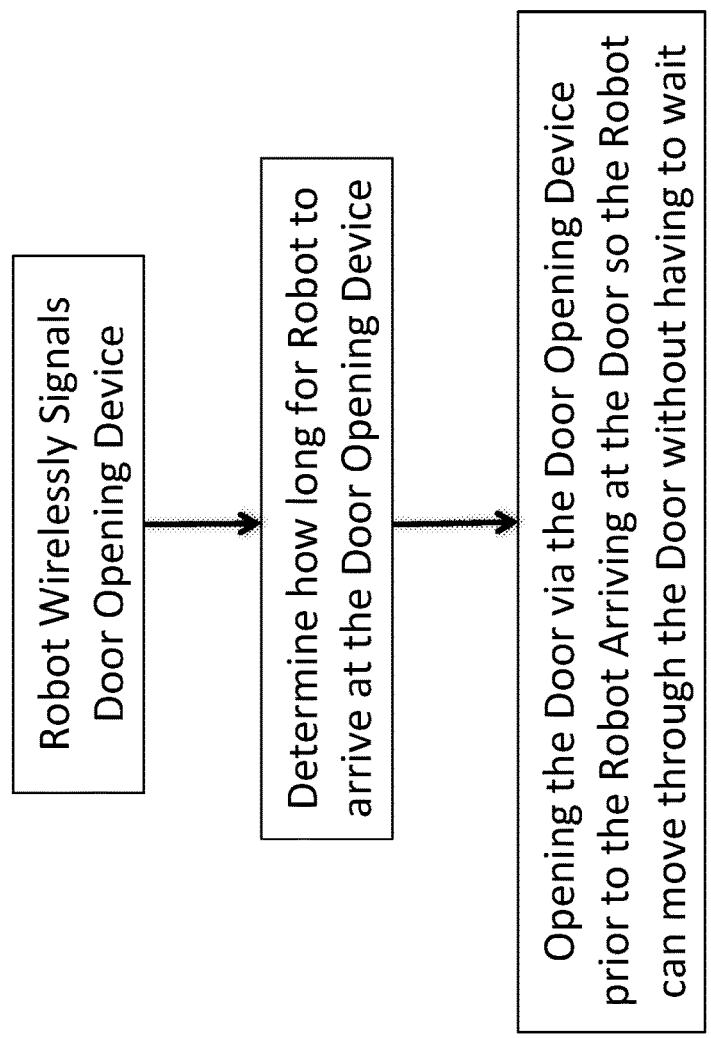
FIG. 10 is a flow diagram of another activity of the mobile robot.

FIG. 7 is a flow diagram of a method 700 involving a mobile robot such as the mobile robot 20 of FIGS. 1-6 within an operating environment 52 of FIG. 8. This method 700 also involves at least one other entity 54 within the operating environment 52, which may be any type of object, device, system or living being. An example of an inanimate entity is a passageway such as a building doorway, a garage doorway, a fence gateway, a barrier gateway, a vehicle gateway, or any other type of pathway, roadway, etc. barrier or obstruction. Another example of an inanimate entity is a lift and/or transport such as an elevator, an escalator, a moving walk, a conveyor, a vehicle, etc. Still another example of an inanimate entity is an item for pickup, transport and/or delivery such as medical supplies, office supplies, government supplies, food, or any other type of articles, goods or provisions. Examples of an animate entity include a human, an animal, a fish, a bird, a reptile, an organism, or any other type of living being.

Examples of an operating environment include a hospital, a clinic, a doctor's office, a triage, or any other type of medical office, facility, building or compound. Other examples of an operating environment include a warehouse, a distribution center or facility, a mail and/or parcel center or facility, a transfer center or facility, a processing center or facility, an airport, a railroad station, a dockyard, a military base, etc. Another example of an operating environment is a hospitality business such as a resort, a hotel, a motel, an inn, a cruise line, a restaurant, a bar, a spa, a theme park, an arena and a stadium.

The method 700 and, more generally, the present disclosure are not limited to the foregoing exemplary mobile robots, entities or operating environments. However, for ease of description, the method 700 will be described below with reference to an elevator car as the entity 54 and a hospital as the operating environment 52. The method 700 will also be described below with reference to the mobile robot 20 of FIGS. 1 and 2 as the mobile robot.

In step 702, the mobile robot 20 is operated to perform at least one task. The mobile robot 20, for example, may be operated to autonomously transport one or more items such as medical supplies from a first location 56 to a second location 58 within the hospital 52 as illustrated in FIG. 8. More particularly, after receiving the medical supplies on or in one or more of its item supports (e.g., drawers, cabinets, compartments), the controller 26 may signal the drive system 24 to move the mobile robot 20 along a path 60 between the first location 56 and the second location 58. To avoid a known or unknown obstacle (e.g., human, object or any other type of other entity) along the path 60, the controller 26 may signal the drive system 24 to slightly or dramatically divert its course around the obstacle based on data received from the sensor system 22. The controller 26 may also or alternatively signal the obstacle (e.g., a remotely actuator doorway) to partially or completely move or open. Upon arriving at the second location 58, the controller 26 may signal the drive system 24 to stop and "park" the mobile robot 20 while the medical supplies are delivered.

As indicated above, the mobile robot 20 may encounter one or more entities (e.g., path obstacles) as it travels from the first location 56 to the second location 58. Some of these entities may be known while others may be unexpected and/or unknown; e.g., a new piece of furniture, a person walking, a wet floor sign, etc. To avoid one or more of the entities, the mobile robot 20 may divert its course as described above with respect to the obstacle. However, diverting its course may increase mobile robot 20 travel time as well as energy consumption. To reduce travel time and/or energy consumption, therefore, a known remotely actuatable entity (e.g., 54) may be signaled or otherwise scheduled to move or otherwise unobstruct the path 60 at a future determined, predetermined or proximate time such that the mobile robot 20 may keep moving along its undiverted path without, for example, slowing or stopping.

In step 704, the entity 54 is signaled to perform one or more tasks for a determined time, which may correspond to a time of arrival of the mobile robot 20 at a location of the entity 54. An elevator may be signaled, for example, to have its elevator car 54 arrive at a floor of the first location 56 before the determined time. The elevator may be further signaled to have a door or doors of the elevator car 54 open at (e.g., precisely on, slightly before or slightly after) the determined time such that completion of this task substantially corresponds with the arrival of the mobile robot 20. In this manner, as the mobile robot 20 arrives at the location of the elevator car 54 at the determined time, the mobile robot 20 may generally travel directly into the elevator car 54 in step 706 without pausing or waiting for the elevator car 54 to arrive and/or the door(s) to open. As a result, mobile robot 20 travel time may be reduced. Mobile robot 20 energy consumption may also be reduced as a result of reduced operation time, etc. Then, upon being brought to a floor of the second location 58 by the elevator car 54, the mobile robot 20 may continue moving on its path 60 to the second location 58.

The entity 54 may be signaled by the mobile robot 20. Alternatively, the entity 54 may be signaled by a remote computer (e.g., 30) which, for example, knows the task assigned to the mobile robot 20 and/or the path 60 along which the mobile robot 20 is traveling. The signal may be a request or a command that immediately calls the elevator car 54. Alternatively, the signal may be a request or a command that calls the elevator car 54 for a certain time in the future; i.e., the determined time. In this manner, the mobile robot 20 or the remote computer 30 may schedule the performance of the task; e.g., the calling of the elevator car 54.

The determined time may be determined based on a time at which the mobile robot 20 is scheduled to arrive at the location of the entity 54; e.g., the elevator car. The determined time may also or alternatively be determined based on a time the mobile robot 20 is predicted or estimated to arrive at the location of the entity 54. This prediction or estimate may be computationally derived based on the current and/or predicted speed of the mobile robot 20 and/or a number of tasks the mobile robot 20 is to perform before arriving at the location of the entity 54. The prediction or estimate may also or alternatively be derived based on the location of the mobile robot 20. For example, when the mobile robot 20 passes a certain point along its path 60, it may be estimated that the mobile robot 20 will arrive at the location of the entity 54 in a certain time based on, for example, recorded data from previous tasks, etc.

The interaction between the mobile robot 20 and the elevator car 54 described above is passive and tangible (e.g., physical). The interaction is passive because the mobile robot 20 passively moves into the elevator car 54 without performing any additional action; e.g., physically opening the elevator car 54 doors. The interaction is tangible because the mobile robot 20 physically engages (e.g., contacts) the elevator car 54 upon driving into its passenger/freight compartment. However, the method 700 and, more generally, the present disclosure are not limited to such passive, physical interactions. For example, once in the elevator car 54, the mobile robot 20 may actively and intangibly (e.g., wirelessly) signal the elevator to move the elevator car 54 to the floor of the second location 58. Alternatively, the mobile robot 20 may use at least one of its manipulators 48 (see FIGS. 4-6) to actively and tangibly press a button on a control panel of the elevator car 54 to control elevator operation. Furthermore, the present method 700 and, more generally, the present disclosure are not limited to the exemplary interactions described above.

In some embodiments, the entity 54 may be an actuatable passageway such as a doorway. This doorway may be signaled to partially or completely open its door for the determined time using an actuator configured therewith. In this manner, the mobile robot 20 may pass through the opened doorway upon arriving at the location of the doorway without pausing or stopping. Similar to the interaction described above with reference to the method 700, the interaction between the mobile robot 20 and the doorway is passive and tangible due to the mobile robot 20 traveling on the ground and/or threshold through the doorway.

In some embodiments, the entity 54 may be an item for pickup, transport and/or delivery. The entity 54, for example, may be the medical supplies to be transported from the first location 56 to the second location 58. In such an embodiment, the signaled or scheduled task may be to bring the medical supplies to the first location 56 for the determined time such that the mobile robot 20 may receive the medical supplies with little or no delay. The mobile robot 20 may passively receive the medical supplies. For example, a person or another device (e.g., a manipulator or another mobile robot) may load the medical supplies with the mobile robot 20. Alternatively, the mobile robot 20 may actively receive the medical supplies. For example, the controller 26 may signal the manipulator(s) 48 configured with the mobile robot 20 (see FIGS. 4-6) to pick up and load the medical supplies with the item support(s).

The signaled or scheduled task may also or alternatively be to have a person or other device (e.g., a manipulator or another mobile robot) go to the second location 58 for the determined time such that the mobile robot 20 may provide the medical supplies to the person or other device with little or no delay. This provision may be passive such that the person or other device removes the medical supplies from the mobile robot 20 at the second location 58. Alternatively, the mobile robot 20 may actively deliver (e.g., pickup and unload) the medical supplies to the person or other device using one or more of its manipulators 48 (see FIGS. 4-6).

In some embodiments, the mobile robot 20 may also reconfigure the entity 54 and/or other objects. The mobile robot 20, for example, may use one or more of its manipulators 48 to re-orient, open, change the form of, or otherwise configure the entity 54. For example, the mobile robot 20 may open the entity 54 to remove some or all of its contents. In another example, the mobile robot 20 may wrap the entity 54 in packaging material and/or affix a label to the entity 54.

In some embodiments, the remote computer 30 may be configured to schedule and assign and/or organize mobile robot 20 tasks. In such embodiments, downtime caused by a power outage and/or slow or interrupted connectivity between the remote computer 30 and the mobile robot 20 may lead to delays in performing tasks and/or interacting with the other entities in the operating environment 52. Therefore, to reduce such downtime, the mobile robot 20 may be configured to assume operations of the remote computer 30 during such circumstances. For example, when the mobile robot 20 loses communication with the remote computer 30 for more than a predetermined period of time, the mobile robot 20 may assign and/or schedule its own tasks until communication is reestablished with the remote computer 30. In such circumstances, the mobile robot 20 may also takeover communication with the other entities in its operating environment 52 so that mobile robot 20 tasks may still be completed in a timely and power efficient manner.

It is to be understood that the terminology used herein is used for the purpose of describing specific embodiments, and is not intended to limit the scope of the present disclosure. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this disclosure belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method of operating an autonomous mobile robot, comprising:
    operating the autonomous mobile robot to move between at least a first location within an environment and a second location within the environment to accomplish at least one task;
    operating the autonomous mobile robot to autonomously summon an elevator device via a wireless communication mechanism to move to a particular floor within the environment where the autonomous mobile robot is currently located;
    determining when the elevator device will be on the particular floor where the autonomous mobile robot is currently located if not already there;
    determining approximately how long the autonomous mobile robot will take to move from its present location to a point on the particular floor where the autonomous mobile robot can access the elevator device; and
    scheduling the elevator device to move to timely arrive at the particular floor where the autonomous mobile robot is currently located and move the autonomous mobile robot to another floor so that the autonomous mobile robot may keep moving along its undiverted path without slowing or stopping in accomplishing its task and thereby conserve energy of at least the autonomous mobile robot.

2. A method of operating an autonomous mobile robot, comprising:
    operating the autonomous mobile robot to move between at least a first location within an environment and a second location within the environment to accomplish at least one task;
    operating the autonomous mobile robot to autonomously signal a door opening device within the environment via a wireless communication mechanism to open a door so that the autonomous mobile robot can move through a doorway in operable communication with the door and the door opening device;
    determining approximately how long the autonomous mobile robot will take to move from its present location in the environment to the door; and
    opening the door prior to the autonomous mobile robot being at the location of the door so that the autonomous mobile robot moves through the doorway when it reaches the door without having to wait for the door to open in order to conserve power of at least the autonomous mobile robot.

* * * * *